United States Patent
Benayoun et al.

(10) Patent No.: US 6,499,061 B1
(45) Date of Patent: Dec. 24, 2002

(54) METHOD AND SYSTEM FOR ASSIGNING LABELS TO DATA FLOWS OVER A PACKET SWITCHED NETWORK

(75) Inventors: Alain Benayoun, Cagnes sur mer (FR); Jacques Fieschi, Saint Laurent du Var (FR); Claude Galand, La Colle sur Loup (FR); Jean-François Le Pennec, Nice (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/330,853

(22) Filed: Jun. 11, 1999

(30) Foreign Application Priority Data

Dec. 11, 1998 (EP) .............................................. 98480086

(51) Int. Cl.[7] .............................................. G06F 15/16
(52) U.S. Cl. ........................ 709/245; 709/200; 709/202; 709/234; 709/238; 709/240; 709/242; 370/218; 370/235; 370/356; 370/400
(58) Field of Search ................................. 709/200–203, 709/232–234, 238, 240, 242, 245; 370/218, 230–232, 235, 351–356, 342–347, 400

(56) References Cited

U.S. PATENT DOCUMENTS

| | | | | |
|---|---|---|---|---|
| 5,265,092 A | * | 11/1993 | Soloway et al. | 370/238 |
| 5,347,511 A | * | 9/1994 | Gun | 370/255 |
| 5,892,924 A | * | 4/1999 | Lyon et al. | 709/245 |
| 5,920,705 A | * | 7/1999 | Lyon et al. | 709/240 |
| 5,935,213 A | * | 8/1999 | Rananand et al. | 709/234 |
| 6,084,855 A | * | 7/2000 | Soirinsuo et al. | 370/235 |
| 6,246,692 B1 | * | 6/2001 | Dai et al. | 370/438 |
| 6,343,067 B1 | * | 1/2002 | Drottar et al. | 370/231 |

* cited by examiner

Primary Examiner—Bharat Barot
(74) Attorney, Agent, or Firm—Cesari and McKenna, LLP

(57) ABSTRACT

Method and system for assigning labels in a data transmission network in which flows of data, composed of packets, are transmitted from a source node to a destination node through a plurality of switching nodes. The network is further characterized in that a label, identifying each flow of data, is added to each packet of the flow of data before the packet is transmitted from a transmitting node to an adjacent receiving node in the network. This so-called identification label is recognized by the receiving node as the identification of the flow of data to be transmitted. Each node in the network assigns an identification label to the packets when a new flow of data is received by the node. Both the transmitting and receiving nodes in the network generate an identical label for a given flow of data. Thus, the overhead associated with the sending of assigned labels from assigning nodes to corresponding upstream or downstream transmitting or receiving nodes in the network is avoided.

49 Claims, 5 Drawing Sheets ns and particularly to a system and method for assigning labels in a data transmission network using label switching.

METHOD AND SYSTEM FOR ASSIGNING LABELS TO DATA FLOWS OVER A PACKET SWITCHED NETWORK

TECHNICAL FIELD

The invention relates generally to data transmission networks wherein flows of data are transmitted from a source node to a destination node through a plurality of switching nodes and particularly to a system and method for assigning labels in a data transmission network using label switching.

BACKGROUND

The use of packet switched networks (PSNs) has become an important technology in the transmitting of data over today's Local and Wide Area Networks (LANs and WANs). In most of these PSNs, each node is used as a switching node after the route for a flow of data from a source node to a destination node has been established by routers located at each node. The assignment of a particular packet to a particular flow of data is done only once as that packet enters the network. The flow to which the packet is assigned is associated with a short fixed length value known as a label. When a packet is forwarded to the next switching node, the label is sent along with it. At subsequent nodes, the label is used as an index into a table which specifies the next node in the flow such that a corresponding new label can be assigned. No further analysis of the packet header is required once a label has been assigned.

The decision to bind a particular label to a particular flow of data is made either by an upstream switching node or by a downstream switching node on the network path. The label assignment is made when the first frame of a flow of data is routed by a node's router. A default label assigned to this first frame of data is replaced by the newly assigned label. The switching node which assigns the label uses a label distribution protocol to inform the linked switching node (either upstream or downstream) of the assigned label. If it is the upstream switching node which is in charge of assigning the label, (known as a forward label assignment mechanism), this node sends a message containing the assigned label to its corresponding downstream switching node. The downstream node then sends an acknowledgment to the upstream switching node. Upon reception of the acknowledgment, the upstream switching node may then start transmitting packets using the assigned label.

If, instead, the downstream switching node is charged with the task of label assignment, (known as a backward label assignment mechanism), it does so upon the receipt of the first packet of a new flow of data. Again, a label distribution protocol is used by the downstream switching node to send a message to its corresponding upstream switching node containing the newly assigned label. At this time, the upstream switching node may start transmitting packets using this newly assigned label without the need for sending an acknowledgment to the downstream node.

Whichever of these label assignment mechanisms is employed, either forward or backward, transmission overhead exists as a result of the need for the label assigning node to inform the corresponding upstream or downstream node of its label assignment decision. This requires that an additional protocol (the so-called label distribution protocol) be used to effect this transmission of the assigned label. Another drawback of using these label assignment mechanisms is associated with the delay in running the label distribution protocol procedure itself. Until this protocol procedure completes and a data flow label is assigned, packets must be routed by a switching node's router by examining the header of each packet received. Inasmuch as several packets will have to be routed in this manner, such systems require expensive, high-performance routers to account for this added transmission overhead.

SUMMARY OF THE INVENTION

Accordingly, it is a purpose of the present invention to provide a system for assigning labels in a data transmission network which does not introduce transmission overhead and does not require high-performance routers at each network node. Another purpose of the invention is to achieve a method of assigning labels in a data transmission network which does not introduce any transmission overhead.

Therefore, the present invention relates to a method and system for assigning labels in a data transmission network in which flows of data, composed of packets, are transmitted from a source node to a destination node through a plurality of switching nodes. The network is further characterized in that a label, identifying each flow of data, is added to each packet of the flow of data before the packet is transmitted from a transmitting node to an adjacent receiving node in the network. This so-called identification label is recognized by the receiving node as the identification of the flow of data to be transmitted. Each node in the network assigns an identification label to the packets when a new flow of data is received by the node. Both the transmitting and receiving nodes in the network generate an identical label for a given flow of data. Thus, the overhead associated with the sending of assigned labels from assigning nodes to corresponding upstream or downstream transmitting or receiving nodes in the network is avoided.

According to another aspect of the invention, a method and system are proposed wherein the identification labels are generated, first by filling an assigned label table with the headers of the flow of data being transmitted and using the address of the location where the header is stored as the identification label, and second by using a label stored in a free label table filled with a list of labels which are freed according to predefined criteria.

BRIEF DESCRIPTION OF THE DRAWINGS

The above and other purposes, features and advantages of the invention will be better understood by reading the following detailed description of a preferred embodiment with reference to the drawings, in which.

DETAILED DESCRIPTION OF THE INVENTION

Figure 1:
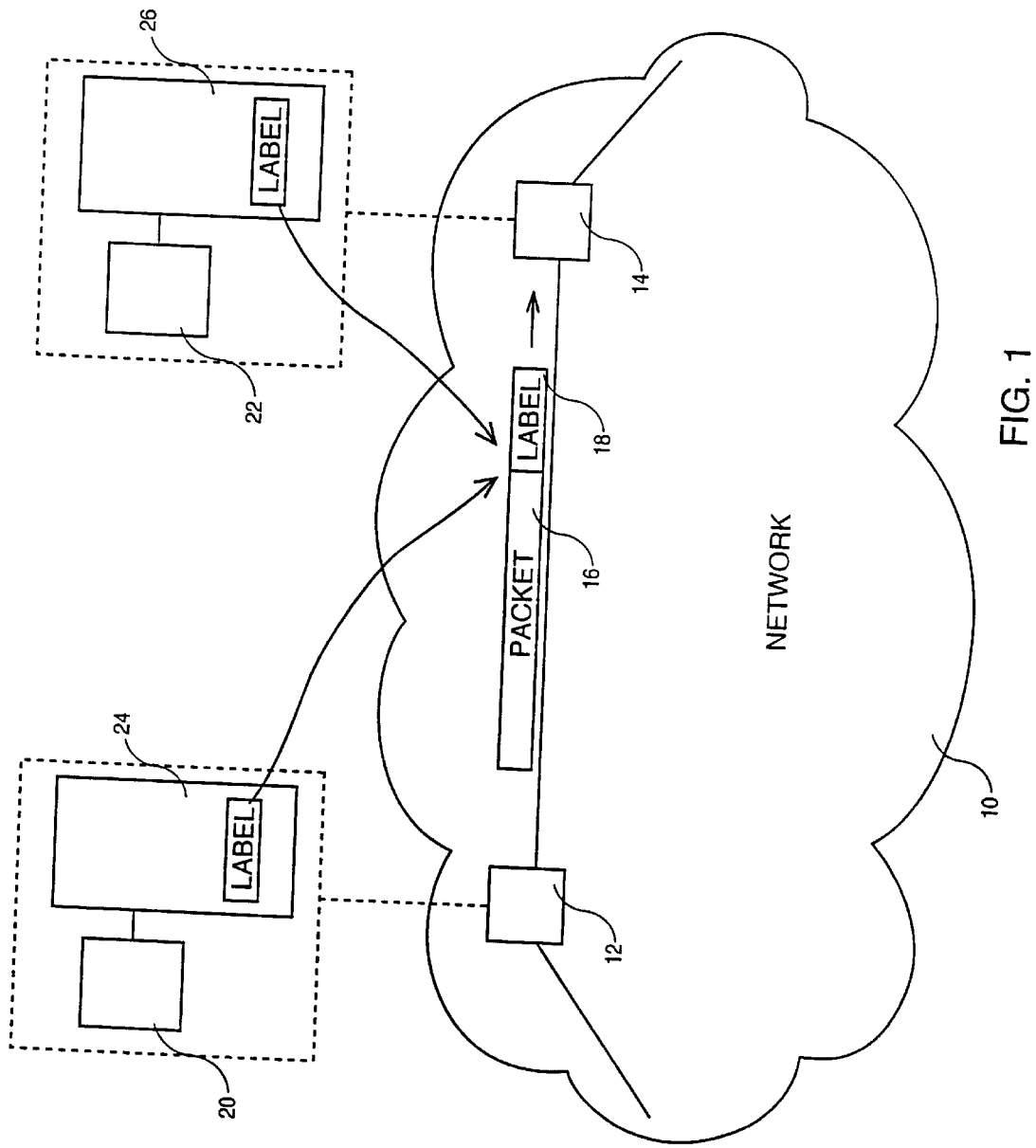
FIG. 1 represents, schematically, a network with a transmitting node linked to an adjacent receiving node for the transmission of a packet, wherein an identification label generated by both transmitting node and receiving node is added to the packet.

As illustrated in FIG. 1, a network 10 in which the invention can be used includes a plurality of switching nodes amongst which only one switching node 12, used as a transmitting node, and an adjacent switching node 14, used as a receiving node, have been represented. Of course, switching node 14 could be a transmitting node and switching node 12 a receiving node for other data transmissions between the two nodes.

Generally, when a packet 16 is received by a switching node 12, a classification process identifies if this packet belongs to a known flow of data. This task may be achieved easily if the packet contains in its header a flow-id field, or alternatively, the classification of the packet may be based on other packet parameters available such as the destination address, the source address, the port number, or perhaps the protocol employed. When a packet 16 is recognized as belonging to a known flow to which a specific label 18 has already been assigned, the packet may be switched and forwarded to a switching node 14 using this unique label information. The switching node 14, in turn, "knows" how to switch or route the packet 16 transmitted with the label 18 by, perhaps, performing a label swapping in order to route the packet to the next node of the path or by removing the label if the node 14 is the last switching node in the network.

If, however, a packet arriving at a switching node 12 is not associated with an existing flow of data and, as such, does not have an assigned label to use, the packet is processed by a label assigning mechanism 20, during which time the packet is forwarded to the receiving switching node 14 with a default label used only to transport the first packet of a flow of data. The receiving switching node 14 also includes a label assigning mechanism 22, identical to that of the first label assigning mechanism 20, such that when the packet 16 arrives with the default label, the same algorithm is run by the second label assigning mechanism 22 as that which was run by the first label assigning mechanism 20. Accordingly, the same label is generated for a given data flow by both label assigning mechanisms 20 and 22. This common label is then stored in an assigned label table 24 of the switching node 12 and in an assigned label table 26 of the adjacent switching node 14, together with the header bytes of the packet. Then, for the subsequent packets in the flow of data, the first switching node 12 adds the assigned label to the packet before forwarding the packets to the downstream switching node 14, which in turn is able to recognize the label and the associated flow of data as a result of the label value stored in its assigned label table 26.

It should be noted that the storage of header bytes in the assigned label tables 24 and 26 is used to characterize the flow, when necessary, in the flow classification process. It may, however, only be necessary to store the flow-id for a particular data flow if this value is available. In addition to containing flow characterization information, the header may also contain information relating to additional data functions such as compression, encryption or prioritization. Even though no flow classification is performed at the receiving node, having the header information available is useful for performing the above-mentioned additional functions as well as for verifying that no mis-assignment of the label has occurred.

Figure 2:
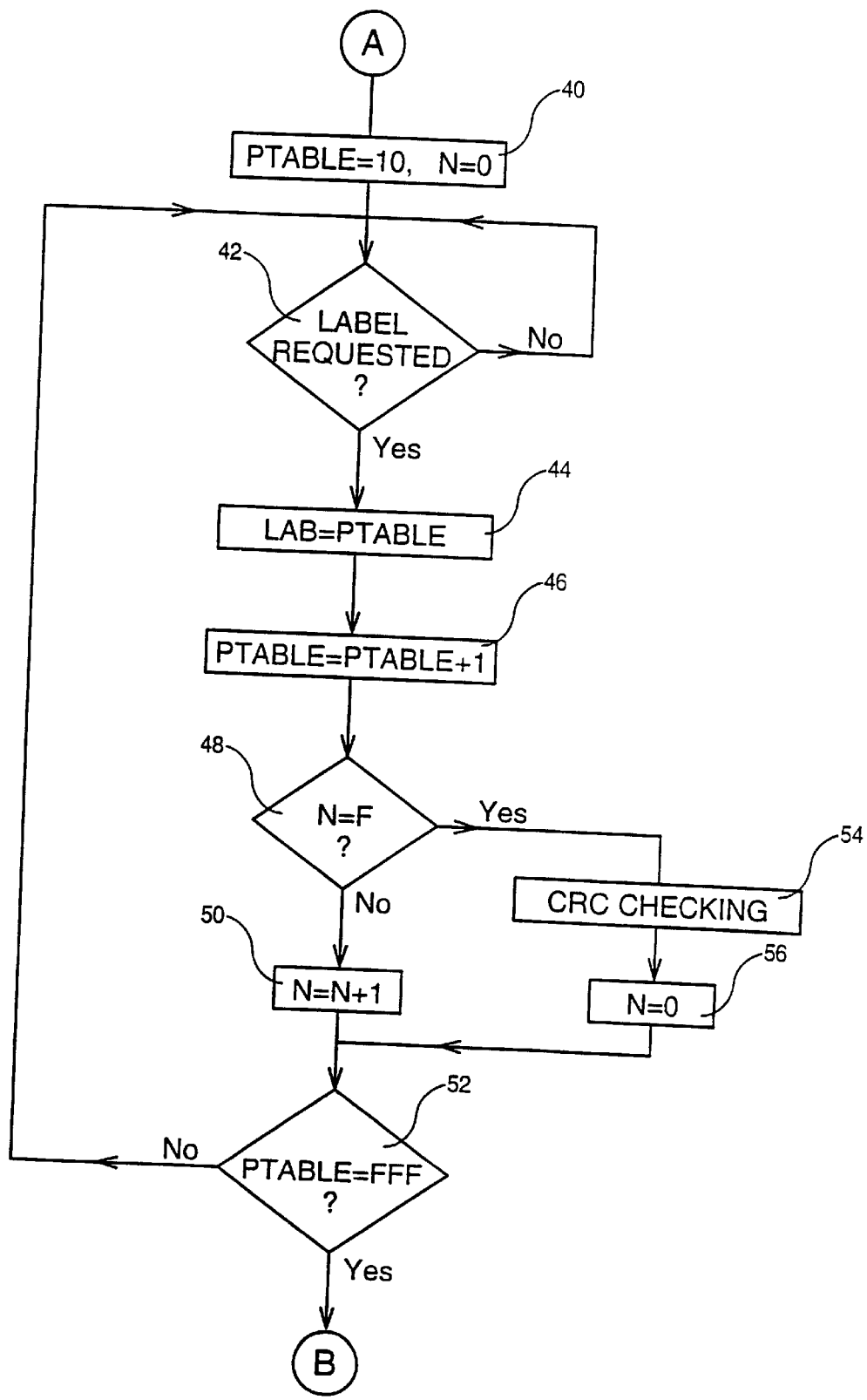
FIG. 2 is a flow diagram of the method of generating labels, practiced by both transmitting and receiving nodes, when the assigned label table is not full.
Figure 3:
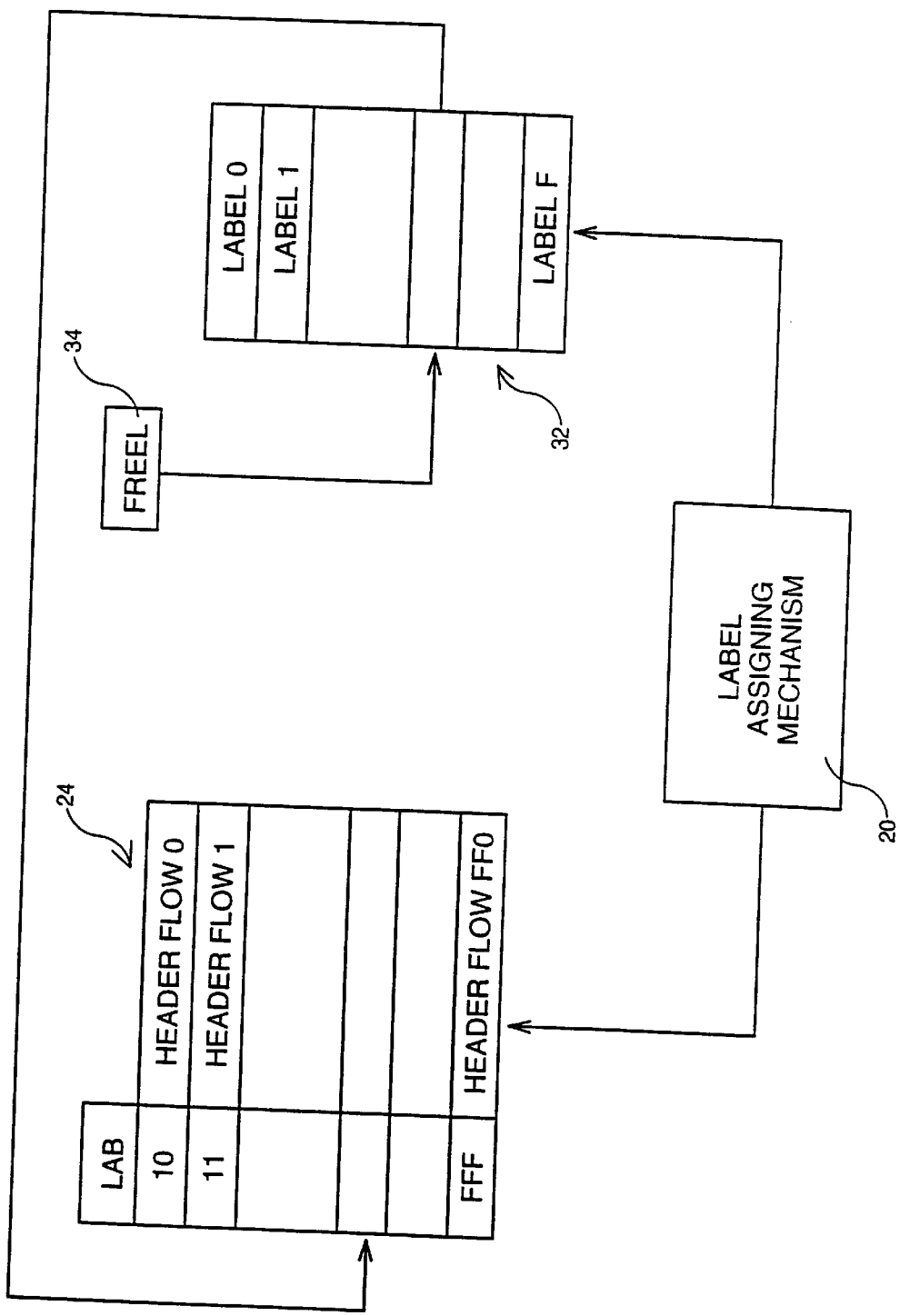
FIG. 3 is a block-diagram representing the assigned label table, the free label table and the label assigning mechanism for controlling the tables.

At the beginning of a communication or after a reset of tables 24 and 26 has occurred, all label values are free to be assigned. The method of assigning a label when neither table 24 or 26 is full is illustrated in flow diagram A of FIG. 2. An example of an assigned label table (in this case table 24 of FIG. 1) is represented in FIG. 3, in which the column "LAB" contains the assigned label values for particular data flows. These LAB values are also the addresses for the various entries in the assigned label table. Note that each LAB value has an associated header which has been detected and stored by the switching node after receiving the first packet of new data flow.

When the process is started, a variable N is set to 0 (step 40) and a pointer PTABLE, assigned to a label table 24, is set to a value different from 0, for example 10 (or A in hexadecimal). This offset is necessary to ensure a set of predefined label values is reserved to transmit non-switched information, such as the one or several default labels used to transmit the first packets of given data flows or perhaps the labels for frames requesting no label attribution.

Next, the process waits for a new label request to occur (step 42). When such a request occurs, the variable LAB is set to PTABLE (step 44) and pointer PTABLE is incremented to PTABLE +1 (step 46). A test is then performed to determine whether the variable N has reached a predetermined limit; in this example, the test is whether N=F (step 48). If the limit has not been reached, variable N is incremented to N+1 (50) and a test is performed to determine whether pointer PTABLE has reached the limit of the table; in this example, a value of FFF (Hex) corresponding to a maximum table address of 12 bits (step 52) is shown. It must be noted that the capacity of the assigned label table is determined as a function of the number of links between transmitting and receiving nodes, but is generally between one to three bytes in length. Finally, as long as the value of PTABLE has not reached its limit, the process repeats, once again by waiting for a new label request to occur (step 42).

The test for determining whether the variable N has reached its limit value, say F (step 48), is used to ensure, through regular checking routines, that both the tables of the transmitting switching node and that of the receiving switching node are identical. Therefore, when N=F, a CRC check of both tables is performed (step 54) and the two nodes exchange a corresponding CRC message to verify they are in sync. If the tables are not in sync, an error handling process is spawned. Such processes are well known in the art and will not be described herein. Note, however, that these error handling processes can result in a reset of the assigned label table. In the majority of cases, no CRC errors are detected, and the value of N is simply reset to 0 (step 56) before the process is continued.

Figure 4:
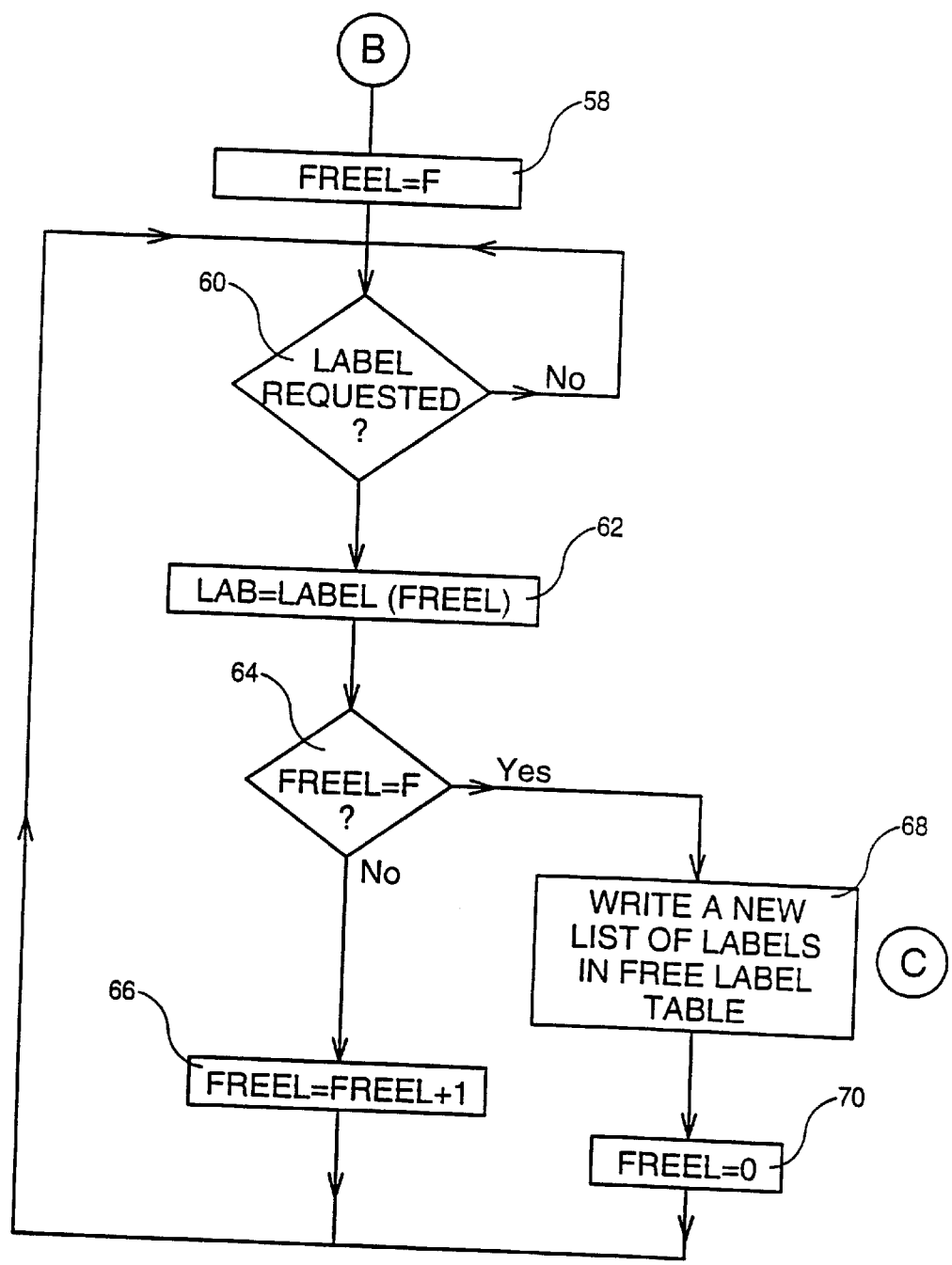
FIG. 4 is a flow diagram of the method of generating labels, practiced by both transmitting and receiving nodes, by freeing a list of new labels when the assigned label table is full.

Once the assigned label table is full, it then becomes necessary to remove currently assigned labels from the table, along with their associated header data flow information, such that these freed labels can be utilized to facilitate the transmission of new data flows of information. This process of assigning free labels is illustrated in flow diagram B of FIG. 4 in connection with the schematic diagram of FIG. 3.

For this process, a free label table (32) of labels to be assigned is associated with an assigned label table 24, storing the label values that are associated with the headers of the flows of data transmitted between the transmitting switching node and the receiving switching node.

When process B is started, a variable FREEL is set (step 58) to a predetermined value, for example F (in hexadecimal) which is a pointer 34 to free label 32 (see FIG. 3). Next, the process waits for a new label request to occur (step 60). When such a request occurs, the variable LAB is set to the label value LABEL contained in the location of table 32 designated by pointer FREEL (step 62). This means that LAB is the label value to be associated with the next packet header to be stored at the address having the LAB value.

Next a test is performed (step 64) to determine whether the variable FREEL has reached the limit address (for example F) of free label table 32. If not, FREEL is incremented by one (step 66) and the process continues, returning to the step of waiting for a new label request to occur (step 60). The capacity of free label table 32 is defined by the user and could be different from the exemplary value of F.

When the value of pointer FREEL reaches its limit, the free label table 32 is filled with a new list of labels (step 68) generated by the label assigning mechanism 20 or 24 of the node and the pointer FREEL is reset to 0 (step 70). The process then continues, returning to the step of waiting for a new label request to occur.

Figure 5:
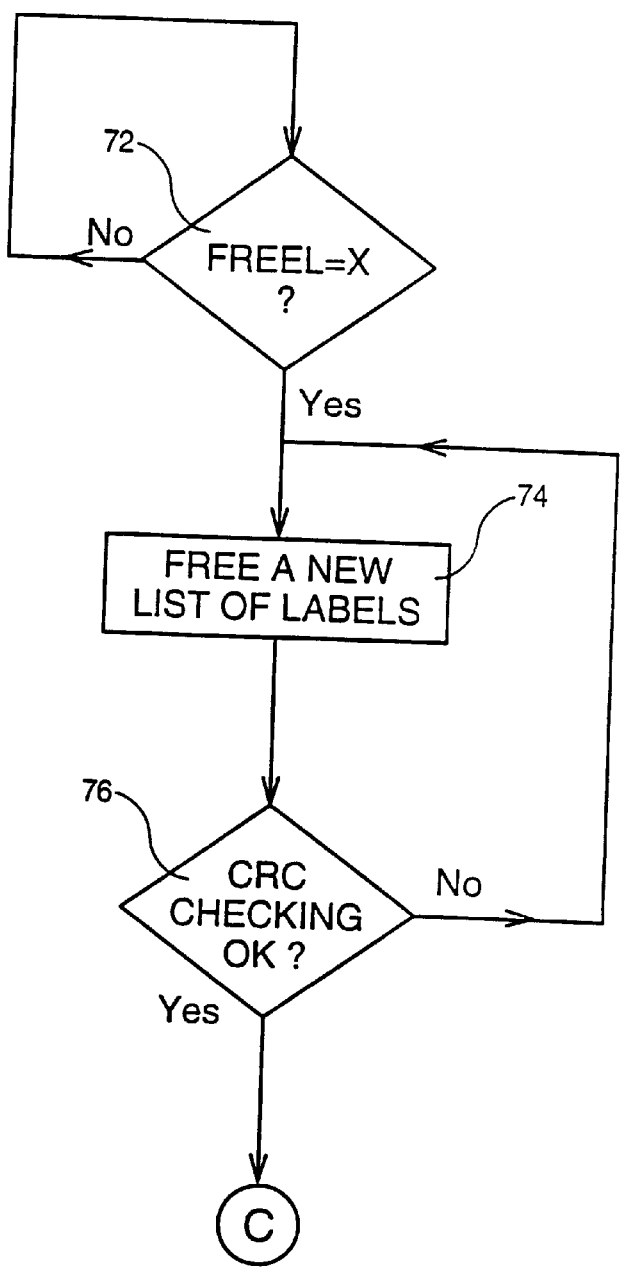
FIG. 5 is a flow diagram of the method of enabling a new list of free labels to be written into the free label table.

The writing of the list of labels in the free label table results from a process described in the flow diagram C of FIG. 5. When the value of pointer FREEL reaches a predetermined value X less than F (step 72) a new list of labels is freed (step 74) by deleting existing labels using predefined deletion criteria. Next, CRC checking is performed (step 76) on the new list of labels to verify that the list of labels generated by the transmitting switching node is identical to the list of labels generated by the receiving switching node.

The criteria used by the label assigning mechanism (20 or 22) for setting a free label can be the age of the labels or the number of label assignment iterations occurring between CRC checks. For example, age values and/or the number of iterations may be stored in additional fields in the tables 24 and 26 and may be updated each time a label is assigned. Either one or both of these criteria may be used by the label assignment mechanism. When both criteria are used, a first sorting is made based on the first criterion, which may result in more candidates becoming available than are needed. The second criterion can then be used to perform further limit the label selection. If identical labels are produced by the mechanism, it will be necessary to introduce a priority selection system since the resulting label values cannot be identical.

While the invention has been described in terms of preferred embodiments, those skilled in the art will recognize that the invention can be practiced with modifications within the spirit and the scope of the appended claims.

Therefore, what is claimed is:

1. A method of data transfer, the method comprising the steps of:
    transferring a flow of data packets along a path from a source node to a destination node through a plurality of adjacently coupled switching nodes operating within a packet switched network;
    identifying, at each node within said path, whether or not a packet is associated with an already known data flow;
    assigning, at each node within said path, a common identification label to a newly identified data flow; and
    sending the packets of a data flow from a transmitting node to an adjacent receiving node within said path, each packet being sent with one of the assigned identification label for an already identified data flow and a default label if no identification label for said data flow has previously been assigned.

2. The method according to claim 1, wherein the step of assigning an identification label comprises the steps of:
    filling an assigned label table with a header associated with the packets of said newly identified data flow; and
    assigning an address of a location of said header within said assigned label table as the identification label of the data flow associated with said header.

3. The method according to claim 2, wherein said method of data transfer further comprises the step of:
    verifying the assigned label tables of said transmitting and receiving nodes are in one-to-one correspondence at a predetermined interval.

4. The method according to claim 3, wherein said predetermined interval is associated with the number of identification labels assigned since a previous verification of said assigned label tables has been performed.

5. The method according to claim 3, wherein an error handling routine is initiated if the assigned label tables of said transmitting and receiving nodes are not in one-to-one correspondence.

6. The method according to claim 1, wherein the step of assigning an identification label comprises the steps of:
    filling a free label table with a list of labels, each of which corresponds to an address location within an associated assigned label table and which are freed according to predefined criteria; and
    assigning a label from said free label table as the identification label of said newly identified data flow.

7. The method according to claim 6, wherein a pointer is used to designate a location within said free label table containing a next label to be assigned as the identification label of said newly identified data flow, said pointer being incremented each time a new label is assigned from said free label table.

8. The method according to claim 6, wherein said method of data transfer further comprises the step of:
    verifying the free label tables of said transmitting and receiving nodes are in one-to-one correspondence at a predetermined interval.

9. The method according to claim 8, wherein said predetermined interval is associated with the number of identification labels assigned since a previous verification of said free label tables has been performed.

10. The method according to claim 8, wherein said predetermined interval is associated with the freeing of said list of labels in said free label table.

11. The method according to claim 8, wherein an error handling routine is initiated if the free label tables of said transmitting and receiving nodes are not in one-to-one correspondence.

12. The method according to claim 8, wherein said predefined criteria for freeing labels is associated with the number of identification labels assigned since a previous verification of said free label tables has been performed.

13. The method according to claim 8, wherein said predefined criteria for freeing labels is associated with at least one of:
    the number of identification labels assigned since a previous verification of said free label tables has been performed; and
    the age of said labels in said free label table.

14. The method according to claim 6, wherein said predefined criteria for freeing labels is associated with the age of said a labels in said free label table.

15. The method according to claim 1, wherein the step of assigning an identification label is selectable between at least one of:
    filling an assigned label table with a header associated with the packets of said newly identified data flow, and assigning an address of a location of said header within said assigned label table as the identification label of the data flow associated with said header; and
    filling a free label table with a list of labels, each of which corresponds to an address location within an associated assigned label table and which are freed according to predefined criteria, and assigning a label from said free label table as the identification label of said newly identified data flow.

16. The method according to claim 15, wherein a pointer is used to designate a location within said free label table containing a next label to be assigned as the identification label of said newly identified data flow, said pointer being incremented each time a new label is assigned from said free label table.

17. The method according to claim 15, wherein said method of data transfer further comprises the steps of:
   verifying the assigned label tables of said transmitting and receiving nodes are in one-to-one correspondence at a first predetermined interval; and
   verifying the free label tables of said transmitting and receiving nodes are in one-to-one correspondence at a second predetermined interval.

18. The method according to claim 17, wherein said first predetermined interval is associated with the number of identification labels assigned since a previous verification of said assigned label tables has been performed.

19. The method according to claim 17, wherein an error handling routine is initiated if the assigned label tables of said transmitting and receiving nodes are not in one-to-one correspondence.

20. The method according to claim 17, wherein said second predetermined interval is associated with the number of identification labels assigned since a previous verification of said free label tables has been performed.

21. The method according to claim 17, wherein said second predetermined interval is associated with the freeing of said list of labels in said free label table.

22. The method according to claim 17, wherein an error handling routine is initiated if the free label tables of said transmitting and receiving nodes are not in one-to-one correspondence.

23. The method according to claim 17, wherein said predefined criteria for freeing labels is associated with the number of identification labels assigned since a previous verification of said free label tables has been performed.

24. The method according to claim 17, wherein said predefined criteria for freeing labels is associated with at least one of:
   the number of identification labels assigned since a previous verification of said free label tables has been performed; and
   the age of said labels in said free label table.

25. The method according to claim 15, wherein said predefined criteria for freeing labels is associated with the age of said labels in said free label table.

26. A system for transferring flows of data, comprising:
   a packet switched network having a plurality of nodes through which a flow of data packets is transferred along a path from one of said nodes, operating as a source node, to another of said nodes, operating as a destination node, through a plurality of adjacently coupled switching nodes, each of said nodes having:
   a data flow identifier which determines whether or not a packet is associated with an already known data flow;
   a label assignment mechanism which assigns a common identification label to a newly identified data flow;
   a transmitter which sends the packets of a data flow to an adjacent node within said path, each packet being sent with one of the assigned identification label for an already identified data flow and a default label if no identification label for said data flow has been previously assigned; and
   a receiver which receives the packets of a data flow and the corresponding assigned identification labels and default labels, sent with said packets, from an adjacent node within said path.

27. The system according to claim 26, wherein each of said nodes further comprises:
   an assigned label table operated on by said label assignment mechanism and which is filled by with a header associated with the packets of said newly identified data flow, wherein an address of a location of said header within said assigned label table is assigned as the identification label of the data flow associated with said header; and
   a free label table operated on by said label assignment mechanism and which is filled with a list of labels, each of which corresponds to an address location within an associated assigned label table and which are freed according to predefined criteria, wherein a label from said free label table is assigned as the identification label of said newly identified data flow.

28. The system according to claim 27, wherein a pointer is used to designate a location within said free label table containing a next label to be assigned as the identification label of said newly identified data flow, said pointer being incremented each time a new label is assigned from said free label table.

29. The system according to claim 27, wherein each of said nodes further comprises:
   a label assignment error processor for verifying the assigned label tables of adjacent nodes in said path are in one-to-one correspondence at a first predetermined interval, and for verifying the free label tables of adjacent nodes in said path are in one-to-one correspondence at a second predetermined interval.

30. The system according to claim 29, wherein said first predetermined interval is associated with the number of identification labels assigned since a previous verification of said assigned label tables has performed.

31. The system according to claim 29, wherein said error processor initiates an error handling routine if the assigned label tables of adjacent nodes in said path are not in one-to-one correspondence.

32. The system according to claim 29, wherein said second predetermined interval is associated with the number of identification labels assigned since a previous verification of said free label tables has been performed.

33. The system according to claim 29, wherein said second predetermined interval is associated with the freeing of said list of labels in said free label table.

34. The system according to claim 29, wherein said error processor initiates an error handling routine if the free label tables of adjacent nodes in said path are not in one-to-one correspondence.

35. The system according to claim 29, wherein said predefined criteria for freeing labels is associated with the number of identification labels assigned since a previous verification of said free label tables has been performed.

36. The system according to claim 29, wherein said predefined criteria for freeing labels is associated with at least one of:
   the number of identification labels assigned since a previous verification of said free label tables has been performed; and
   the age of said labels in said free label table.

37. The system according to claim 27, wherein said predefined criteria for freeing labels is associated with the age of said labels in said free label table.

38. A device for transferring flows of data packets, comprising:
- a data flow identifier which determines whether or not a packet is associated with an already known data flow;
- a label assignment mechanism which assigns a common identification label to a newly identified data flow;
- a transmitter which sends the packets of a data flow to an adjacent node within a network path, each packet being sent with one of the assigned identification label for an already identified data flow and a default label if no identification label for said data flow has been previously assigned; and
- a receiver which receives the packets of a data flow and the corresponding assigned identification labels and default labels, sent with said packets, from an adjacent node within said network path.

39. The device according to claim 38, further comprising:
- an assigned label table operated on by said label assignment mechanism and which is filled by with a header associated with the packets of said newly identified data flow, wherein an address of a location of said header within said assigned label table is assigned as the identification label of the data flow associated with said header; and
- a free label table operated on by said label assignment mechanism and which is filled with a list of labels, each of which corresponds to an address location within an associated assigned label table and which are freed according to predefined criteria, wherein a label from said free label table is assigned as the identification label of said newly identified data flow.

40. The device according to claim 39, wherein a pointer is used to designate a location within said free label table containing next label to be assigned as the identification label of said newly identified data flow, said pointer being incremented each time a new label is assigned from said free label table.

41. The device according to claim 39, further comprising:
- a label assignment error processor for verifying the assigned label tables of adjacent nodes in said path are in one-to-one correspondence at a first predetermined interval, and for verifying the free label tables of adjacent nodes in said path are in one-to-one correspondence at a second predetermined interval.

42. The device according to claim 41, wherein said first predetermined interval is associated with the number of identification labels assigned since a previous verification of said assigned label tables has been performed.

43. The device according to claim 41, wherein said error processor initiates an error handling routine if the assigned label tables of adjacent nodes in said path are not in one-to-one correspondence.

44. The device according to claim 41, wherein said second predetermined interval is associated with the number of identification labels assigned since a previous verification of said free label tables has been performed.

45. The device according to claim 41, wherein said second predetermined interval is associated with the freeing of said list of labels in said free label table.

46. The device according to claim 41, wherein said error processor initiates an error handling routine if the free label tables of adjacent nodes in said path are not in one-to-one correspondence.

47. The device according to claim 41, wherein said predefined criteria for freeing labels is associated with the number of identification labels assigned since a previous verification of said free label tables has been performed.

48. The device according to claim 41, wherein said predefined criteria for freeing labels is associated with at least one of:
- the number of identification labels assigned since a previous verification of said free label tables has been performed; and
- the age of said labels in said free label table.

49. The device according to claim 39, wherein said predefined criteria for freeing labels is associated with the age of said lays in said free label table.

* * * * *